United States Patent Office

3,345,052
Patented Oct. 3, 1967

3,345,052
METHOD AND MEANS OF CALCINING
LIMESTONE
Hubert L. Hall, Toronto, Canada, assignor, by mesne assignments, to Calcimatic International Ltd., Nassau, Bahamas, a corporation of the Bahamas
Continuation of application Ser. No. 344,012, Feb. 11, 1964. This application Oct. 14, 1966, Ser. No. 586,897
7 Claims. (Cl. 263—27)

ABSTRACT OF THE DISCLOSURE

A process for calcining limestone to produce lime having a sulphur content of less than about 0.03% by weight in which the limestone charge is first subjecetd in indirect heat exchange in an elongated confined zone with exhaust gases at a temperature of below about 650° F. and then is subjected to direct heat exchange with exhaust gases at a temperature above about 650° F. The apparatus comprises elongated heat exchange tubes through which the limestone first passes, the tubes being provided with turnover boxes and the apparatus including baffles between groups of the heat exchange tubes to direct hot gases into contact with the tubes of the groups.

---

This application is a continuation of my copending application Ser. No. 344,012, filed Feb. 11, 1964, now abandoned.

My invention relates to an improved method of an apparatus for calcining limestone and more particularly to a method and means for producing lime having a very low sulphur content.

As is known in the prior art, limestone, which is largely calcium carbonate, is reduced to lime or calcium oxide by subjecting the limestone to a high heat for a predetermined period of time. The resulting lime has a wide variety of uses. For example, it is used in the production of steel. One highly efficient modern method of making steel is by the oxygen lance method, as in the Brassert oxygen furnace, which reduces ore at a very rapid rate as compared with other processes.

Almost all limestone contains some percentage of sulphur which usually runs about 0.09% by weight of the limestone. One of the requirements when using the Brassert furnace is that the lime employed have a very low sulphur content of less than about 0.03% by weight of the lime.

My prior patent, No. 3,050,298, discloses a calcining means and method for breaking limestone down to produce lime. One step of the process disclosed therein is the use of the hot gases of combustion to preheat the charge of limestone being fed to the rotary hearth. I have discovered that if I employ the method and apparatus shown in my prior patent without preheating the limestone with exhaust gas, I am able to produce lime having a percentage of sulphur of only about 0.015%. While lime having this sulphur content would be satisfactory for use in the oxygen lance method of steel making, the fuel economy in that method of producing lime is so poor as to make the process impracticably expensive. Moreover, I have also discovered that if the charge of limestone being fed to the hearth is not preheated, the stone spalls and cracks and is thus degraded when it hits the high temperature rotary hearth in the calcining zone. Thus, not only is the fuel economy extremely poor but also there is a large loss of limestone if the process is practiced without preheating the limestone with exhaust gases. For these reasons, in order for the process to be practicable, it is necessary to heat the limestone charge being fed to the hearth. However, when the charge is preheated in this manner, the resultant lime is found to have a sulphur content of 0.098% by weight which is entirely unsuitable for use in the steel producing method described above.

The exhaust gases in the process disclosed in my prior patent are at a temperature of about 1000° F. I have discovered that the limestone must be preheated to above a minimum temperature of about 250° F. to prevent degradation of the stone by spalling and cracking. I have further discovered that if exhaust gases at a temperature of below about 650° F. are brought into contact with the limestone being fed to the hearth, the resulting lime has an excessively high sulphur content. If, on the other hand, the temperature of the exhaust gases to which the limestone is subjected is above about 650° F., no sulphur apparently is deposited and the resulting lime has a very low sulphur content.

I have invented an improved method of calcining limestone which is more efficient than are methods of the prior art. My improved method results in lime having a very low sulphur content while at the same time avoiding spalling and cracking of the limestone. My method produces a lime which is especially suited for use in the oxygen lance method of making steel. I have also invented apparatus for carrying out my improved method.

One object of my invention is to provide an improved method for calcining limestone which is more efficient than are methods of the prior art.

Another object of my invention is to provide a method of calcining limestone to produce lime having a very low sulphur content while at the same time avoiding spalling and cracking of the limestone.

A further object of my invention is to provide an improved method of calcining limestone to produce lime which is especially suited for use in the oxygen lance method of making steel.

Other and further objects of my invention will appear from the following description.

In general my invention contemplates the provision of an improved method of calcining limestone in which I subject the limestone charge to the temperature of the exhaust gases in two stages as it is fed to the hearth. In the first stage the exhaust gases at a temperature of above about 650° F. are brought directly into contact with the limestone adjacent the hearth. In the second stage heat exchangers subject the charge being fed to the temperature of the exhaust gases at below about 650° F. while preventing contact between the gases and the limestone.

In the accompanying drawings which form part of the instant specification and which are to be read in conjunction therewith and in which like reference numerals are used to indicate like parts in the various views:

FIGURE 1 is a top plan view of one form of my apparatus for practicing my improved method of calcining limestone.

FIGURE 2 is a sectional view of the form of my apparatus shown in FIGURE 1 taken along the line 2—2 of FIGURE 1 with parts removed for clarity in exposition.

FIGURE 3 is a sectional view of my apparatus for practicing my improved method with parts broken away.

FIGURE 4 is a sectional view of the form of my apparatus shown in FIGURE 3 and taken along the line 4—4 of FIGURE 3.

FIGURE 5 is a sectional view of the form of my apparatus shown in FIGURE 4 and taken along the line 5—5 of FIGURE 4.

FIGURE 6 is a sectional view of the form of my apparatus shown in FIGURE 4 taken along the line 6—6 of FIGURE 4.

FIGURE 7 is a sectional view of some of the heat

United States Patent Office 3,345,053
Patented Oct. 3, 1967

3,345,053
APPARATUS FOR STOPPING AIR FLOW INTO BLAST FURNACES
Thomas E. Clair, Peters Township, Washington County, Pa., assignor to United States Steel Corporation, a corporation of Delaware
Filed Mar. 16, 1965, Ser. No. 440,167
2 Claims. (Cl. 266—30)

ABSTRACT OF THE DISCLOSURE

A device for stopping flow of air into a blast furnace undergoing repair. Includes a curved metal dish slipped between the elbows of the penstock. Removed when the furnace is in operation.

This invention relates to a safety device for use on a blast furnace and to an improved method of shutting off the wind to a blast furnace.

A conventional blast furnace includes a bustle pipe surrounding the lower portion of the furnace (the "bosh"), a plurality of tuyeres leading into the furnace, and penstocks and blowpipes connecting the bustle pipe with the individual tuyeres. A hot air blast is introduced to the furnace via the bustle pipe, penstocks and tuyeres. When repair work is preformed at the top of the furnace with the furnace in operation, it is necessary to shut off completely the blast or "wind." Conventionally this is done by removing the blowpipes and packing clay into the tuyeres, since it is not sufficient merely to stop the blowers. This is a hazardous and laborious operation, and causes excessive downtime.

An object of the present invention is to provide an improved safety device and method of shutting off the wind which avoid the difficulties encountered in conventional practice.

A further object is to provide a device and method of the foregoing type which enable the wind to be shut off completely without removing the blowpipe nor packing the tuyeres and later removing the packing material.

A further object is to provide, in combination with a blast-furnace penstock, a safety device which consists of a metal dish removably inserted between parts of the penstock to shut off the wind.

In the drawing:

FIGURE 1 is a vertical sectional view, partly in elevation, showing a portion of a blast furnace in which my safety device is installed; and FIGURE 2 is a perspective view of the device removed from the furnace.

FIGURE 1 shows a portion of a conventional blast furnace which includes a bosh wall 10, a tuyere 12 extending into the wall, and a blowpipe 13 connected to the tuyere. A bustle pipe 14 surrounds the bosh. A two-part penstock formed of upper and lower elbows 15 and 16 connects the bustle pipe with the blowpipe. A yoke or ring 17 is fixed to the lower end of the upper elbow 15 and carries outwardly projecting hooks 18. Spaced-apart brackets 19 are fixed to the upper portion of the lower elbow 16 below these hooks. Slotted eye bolts 20 are fitted over the hooks and have wedges 21 received in their slots and engaging under the brackets 19. Thus the eye bolts and wedges hold the two elbows of the penstock together, but allow them to be separated readily. Of course other equivalent fastening means are available and could be used for this purpose. This structure is duplicated at each tuyere, of which typically there are about twenty spaced around the furnace circumference.

My safety device comprises a metal dish 22 which is concave on one face and convex on the other and has an integral handle 23 extending from one edge. When I wish to shut off the wind to the furnace, I remove the wedges 21 and eye bolts 20 at each tuyere to separate the upper and lower elbows 15 and 16 of the penstock. Next I insert the dish 22 of my safety device between the abutting ends of the elbows with the convex face of the dish directed downwardly. The curvature of the dish enables the dish to be slipped easily into place. The dish is of the same diameter as the ends of the elbows. Thereafter I replace the eye bolts and wedges. When thus installed, my safety device effectively prevents any seepage of air into the furnace and enables workmen to make repairs at the top. When such work is concluded, I remove the device to enable normal operation of the furnace to be resumed.

From the foregoing description, it is seen that my invention affords a simple method and device for shutting off the wind to the tuyeres of a blast furnace. The device can be installed or removed quickly with a minimum of disturbance of other parts. The blowpipes remain in place, which is an important advantage, since they are extremely hot and are ceramic lined and easily broken.

While I have shown and described only a single embodiment of my invention, it is apparent that modifications may arise. Therefore, I do not wish to be limited to the disclosure set forth but only by the scope of the appended claims.

I claim:

1. The combination, with a blast-furnace penstock which includes upper and lower separable refractory lined elbows having vertical legs which normally abut end-to-end and releasable means coupling said vertical legs together, of a safety device shutting off flow of wind through said elbows while the furnace undergoes repairs, said device comprising a circular metal dish concave on the top and convex on the bottom and being of a diameter approximately equal to the diameter of said vertical legs, and an integral handle extending from one edge of said dish, said dish being removably slipped between the normally abutting ends of said vertical legs when said legs are separated and said coupling means released, and thereafter held in place by said coupling means.

2. A combination as defined in claim 1 in which said coupling means includes hooks projecting outwardly from the vertical leg of said upper elbow, spaced apart brackets projecting outwardly from the vertical leg of said lower elbow, slotted eye bolts fitted over said hooks, and wedges received in the slots of said eye bolts and engaging under said brackets.

References Cited
UNITED STATES PATENTS

| 707,601 | 8/1902 | Laughlin | 110—182.5 |
| 2,295,901 | 9/1942 | Jones | 266—30 |
| 2,645,244 | 7/1953 | Klickman | 138—94 X |

J. SPENCER OVERHOLSER, *Primary Examiner.*

E. MAR, *Assistant Examiner.*